US009886629B2

(12) United States Patent
Jain et al.

(10) Patent No.: US 9,886,629 B2
(45) Date of Patent: Feb. 6, 2018

(54) TECHNIQUES FOR RESTORING CONTENT FROM A TORN DOCUMENT

(71) Applicant: Adobe Systems Incorporated, San Jose, CA (US)

(72) Inventors: Ajay Jain, Ghaziabad (IN); Ram Bhushan Agrawal, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/138,349

(22) Filed: Apr. 26, 2016

(65) Prior Publication Data
US 2017/0308745 A1 Oct. 26, 2017

(51) Int. Cl.
| | |
|---|---|
| *G06K 9/00* | (2006.01) |
| *G06T 7/00* | (2017.01) |
| *G06T 7/40* | (2017.01) |
| *G06K 9/20* | (2006.01) |
| *G06K 9/18* | (2006.01) |
| *G06K 9/03* | (2006.01) |

(52) U.S. Cl.
CPC ......... *G06K 9/00456* (2013.01); *G06K 9/036* (2013.01); *G06K 9/18* (2013.01); *G06K 9/2081* (2013.01); *G06T 7/0028* (2013.01); *G06T 7/0085* (2013.01); *G06T 7/408* (2013.01); *G06T 2207/10008* (2013.01); *G06T 2207/10024* (2013.01)

(58) Field of Classification Search
CPC .. G06K 9/00456; G06K 9/4604; G06K 9/036; G06K 9/18; G06K 9/2081; G06T 7/0028; G06T 7/0085; G06T 7/408
USPC ....................................................... 382/112
See application file for complete search history.

(56) References Cited

U.S. PATENT DOCUMENTS

| | | | |
|---|---|---|---|
| 2011/0052082 A1* | 3/2011 | Parkov ................. | G06K 9/2018 382/209 |
| 2014/0029073 A1* | 1/2014 | Wang ................... | H04N 1/4097 358/518 |
| 2014/0212049 A1* | 7/2014 | Honda .................. | G06T 7/0085 382/199 |

* cited by examiner

*Primary Examiner* — Van D Huynh
(74) *Attorney, Agent, or Firm* — Kilpatrick Townsend & Stockton LLP (57) ABSTRACT

Disclosed are various embodiments for digitally restoring content from a torn document. A computing device obtains an image of a document that has a tear. The computing device identifies portions of the image separated by a gap region representing the tear in the document. Content in the portions of the image adjacent to the gap region is then identified. The position of a portion of the image is incrementally adjusted to reduce the gap region without overlapping the portions. The position of the portion is adjusted to align the content along a boundary between the portions of the image.

15 Claims, 8 Drawing Sheets

TECHNIQUES FOR RESTORING CONTENT FROM A TORN DOCUMENT

BACKGROUND

Physical documents, such as pages in magazines, books, and pamphlets, can easily become torn due to age or mishandling. Once torn, the documents become difficult to read, organize, and handle as page content gets separated across pieces. In a more general sense, a torn document suffers a loss of aesthetics. Attempts at repairing an individual document can be made by placing the torn sections next to each other and using a glue or other adhesive to join them. However, this technique is manually intensive, and often results in a further loss of aesthetics due to a conspicuously imperfect repair.

SUMMARY

Various aspects of the present invention relate to digitally restoring content from a torn document. In one implementation, a computer implementing the restoration service obtains an image of a physical document that has a tear. The image can originate from a document scanner operating on the physical document, from a camera capturing a photo of the document, such as the camera of a smartphone, or from other possible sources. The computer identifies portions of the image representing the document that are separated by one or more gap regions representing one or more tears in the document. A gap region can be identified based on recognizing separation among identified document portions of the image, recognizing the presence of the background of the image within a document portion, recognizing a distinction among a color and/or texture from the document portion, recognizing a difference in "smoothness" of a border in the document portion in comparison to other borders of the portion, and/or based on other possible detection operations.

The computer then identifies content in the document portions of the image adjacent to the gap region. The content can be identified based on recognizing figures, text, and colors present in the document portions of the image adjacent to the gap region, as well as the shapes and/or smoothness of the edges of the document portions. The positions of the document portions of the image are incrementally adjusted to reduce the gap without overlapping the portions, such that the content is aligned along a boundary between the portions of the image. The adjustments to the positions can include repositioning one or more of the document portions through use of horizontal, vertical, or/and angular/rotational movements.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
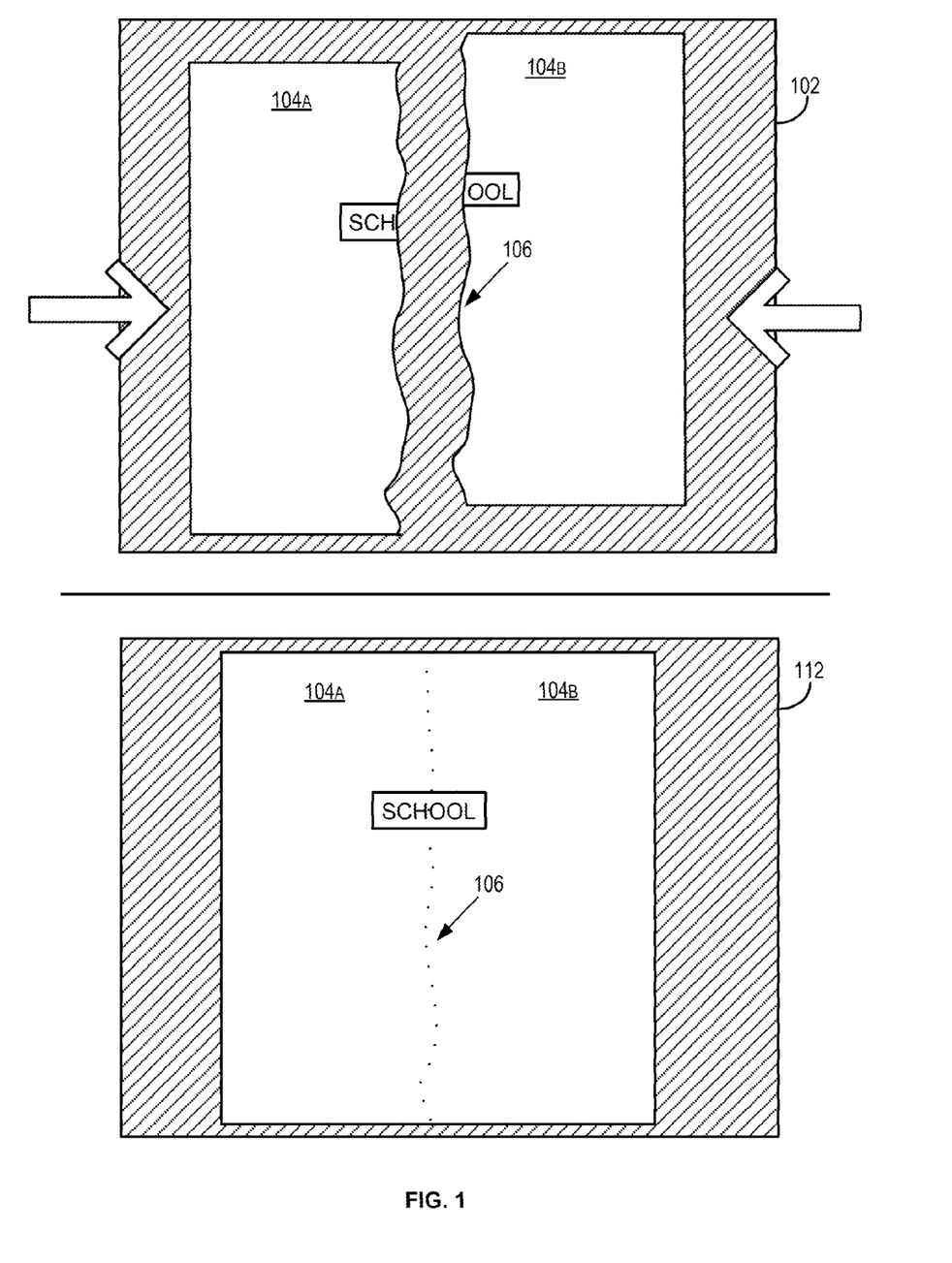
FIG. 1 is a pictorial diagram of an example image content restoration performed by the computing environment operating in the networked environment of FIG. 2 according to various embodiments of the present disclosure.

Disclosed herein are various embodiments relating to producing a restored digital copy of a torn document by acquiring an image of the document that has one or more tears and correcting the position of portions of the image near the tear(s) in order to restore the content of the document to its original state. With reference to FIG. 1, shown is an exemplary image 102 provided by a user who has requested restoration of the document content shown in the image. The torn physical document that is captured in the image 102 includes two separate document portions 104a and 104b, though more tears and/or incomplete tears in the document can also be accommodated using the same techniques. The document portions 104a-b in the exemplary image 102 are separated by a gap region 106 representing the space between the two distinct pieces of the torn physical document as it was captured in the image.

Using the techniques described herein, a computer can identify the document portions 104a-b within the exemplary image 102 based upon distinguishing the portions 104a-b from the surrounding background of the image 102, as well as potentially by recognizing content (e.g. text, figures) in these portions 104a-b of the image 102. The gap region 106, representing a tear in the document, is identified in the image based on recognizing the presence of the background of the image (shown as diagonal lines) between the portions 104a-b.

Subsequently, any content in the portions 104a-b of the image 102 that are adjacent to the gap region 106 is identified, such as the framed banner with the letters "SCH" in portion 104a and with the letters "OOL" in portion 104b. The content in this example can be identified based on use of optical character recognition (OCR) and identifying the lines that make up the figure of the frame enclosing the letters. Once the portions 104a-b of the image 102 have been examined to identify any content, the positions of the portions 104a-b are adjusted to reduce the gap region 106 without overlapping the edges of the portions. In particular, the position of one or more of the portions 104a-b is adjusted to align the identified content along a boundary between the torn portions. In some instances, this includes making coarse adjustments to the position based on the shape of the edges of the portions 104a-b adjacent to the gap region 106 and/or based on, in this example, aligning the top or bottom edges of the portions 104a-b. Once coarse adjustments have been made, more precise adjustments can be made to the position of the portions 104a-b based on the content, such as aligning the position of the "SCH" letters with the "OOL" letters. A spell check can be used to further validate the aligned position of the portions 104a-b results in the concatenated sequence of letters spelling a word. In addition, adjustments to the position of the portions 104a-b can also be made based on aligning the lines of the frame around the letters until a straight line is made.

Once the adjustments to the positions 104a-b of the image 102 have been made, the corrected image may be stored, such as shown in the image 112. In the image 112, the location of the gap region 106 that previously divided the portions 104a-b is shown for illustrative purposes, though such a visible line may not be shown during a typical presentation of the image 112. Thereafter, the corrected image 112 may be made available to a requesting end-user. In the following discussion, a general description of the system and its components is provided, followed by a discussion of the operation of the same.

As used herein, an "image" is a set of digital data in which a visual representation of an object, such as a physical document, is captured. An image may be stored in various possible data formats, such as a traditional image format (e.g., graphics interchange format (GIF)), a document format (e.g., portable document format (PDF)), and/or other possible formats.

As used herein, a "gap region," or simply a "gap," in an image refers to a continuous region of the image that corresponds to a tear in a physical document represented in the image. As can be appreciated, a document may have one or more tears and thus an image may have one or more gap regions. The gap regions in the image may further correspond to tears that are either partial tears in the document or complete tears representing detached portions of the document.

Figure 2:
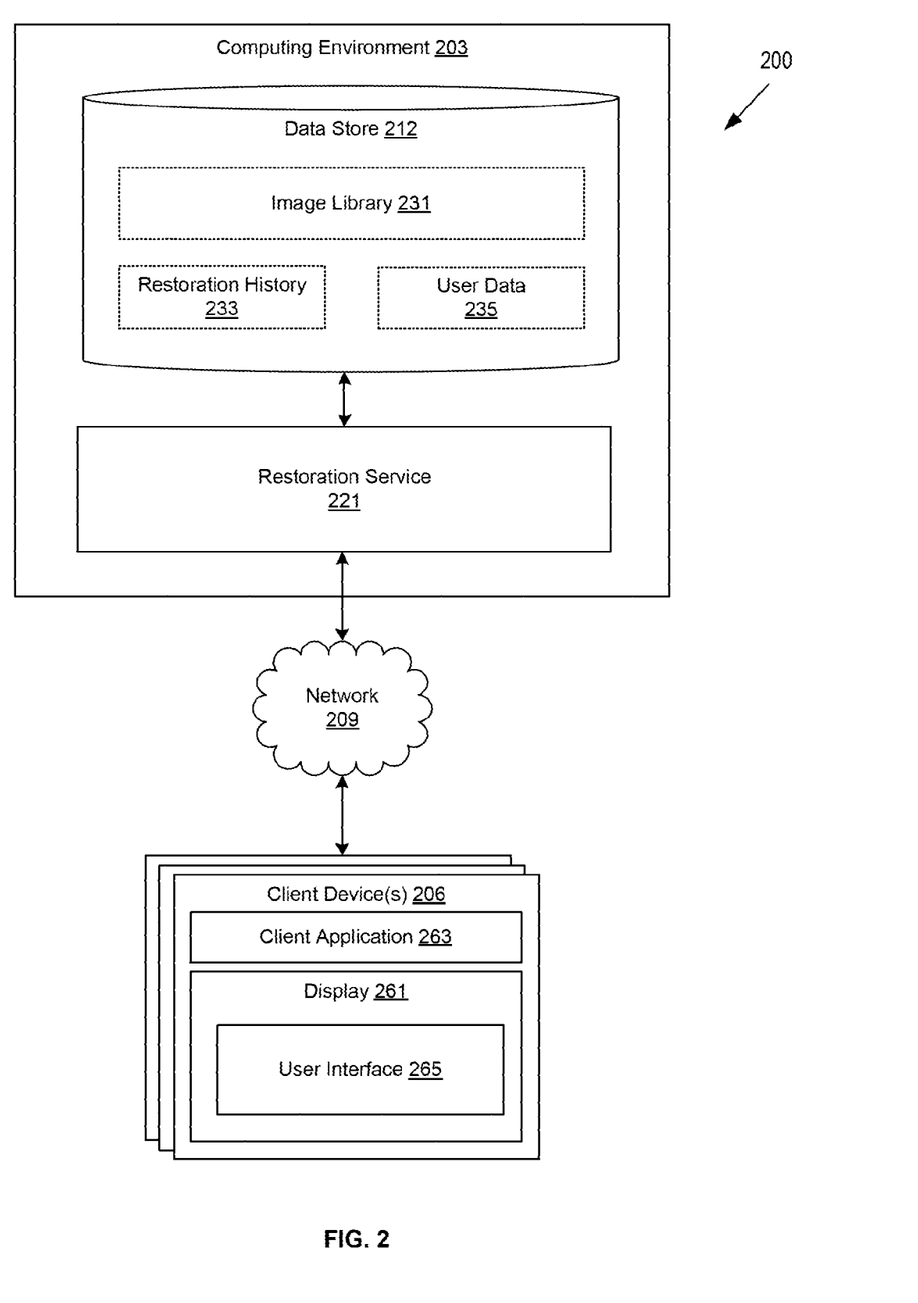
FIG. 2 is a drawing of a networked environment according to various embodiments of the present disclosure.

With reference to FIG. 2, shown is an illustrative networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. Although the functionality described herein is shown in the context of the networked environment 200, other implementations are possible, such as implementing the functionality in a single computing device (e.g. desktop computer or mobile device), as a plug-in or auxiliary feature of another service executed in a computing device, and/or in arrangements of computing devices other than those shown in FIG. 1.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an restoration service 221 and other applications, services, processes, systems, engines, or functionality not discussed in detail herein. The restoration service 221 is executed to automatically produce a restored digital copy of a torn document by acquiring an image of the document that has one or more tears and correcting the position of portions of the image near the tear(s) in order to restore the content of the document to its original state.

The data stored in the data store 212 includes, for example, image library 231, restoration history 233, user data 235, and potentially other data. The image library 231 includes images associated with various users of the restoration service 221, metadata associated with the images, etc. The images can be stored in various data formats such as joint photographic experts group (JPEG), GIF, PDF, portable network graphics (PNG), POSTSCRIPT, bitmap, raw, tagged image file format (TIFF), and/or other formats as can be appreciated. The metadata for an image may include orientation and/or position information for one or more portions of an image, previous versions of the image, an identifier for the image capture device used, capture settings used (e.g. flash, shutter speed, etc.), geographic location ("geolocation") of the capture, time/date of capture, thumbnail images, and/or other possible metadata. In some implementations, one or more of the images may be references (e.g. URLs) to images stored external to the data store 212.

The restoration history 233 includes a history of each user's activities associated with the corrections undertaken by the restoration service 221, such as user-provided accuracy ratings for corrections undertaken by the restoration service 221, characteristics of the areas of images identified as gaps regions by the user, etc. For example, the restoration history 233 may include identifiers of the images in which a user rated the restoration performed as highly favorable, as well as the actions undertaken by the restoration service 221 for those images.

The user data 235 includes various data associated with users of the restoration service 221 and/or who have images stored in the image library 231. The user data 235 may include user credentials, identifiers of images stored by the user, preferences, and/or other possible data.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 261. The display 261 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 206 may be configured to execute various applications such as a client application 263 and/or other applications. The client application 263 may be executed in a client 206, for example, to access network content served up by the computing environment 203 and/or other servers, thereby rendering a user interface 265 on the display 261. To this end, the client application 206 may comprise, for example, a browser, a dedicated application, etc., and the user interface 265 may comprise a network content page, an application screen, etc. The client 206 may be configured to execute applications beyond the client application 263 such as, for example, email applications, social networking applications, word processors, spreadsheets, and/or other applications.

Next, a general description of the operation of the various components of the networked environment 200 is provided. To begin, a user operating the client 206 employs the client application 263 to establish a communication session with the restoration service 221. The communication session may be carried out using various protocols such as, for example, hypertext transfer protocol (HTTP), simple object access protocol (SOAP), representational state transfer (REST), user datagram protocol (UDP), transmission control protocol (TCP), and/or other protocols for communicating data over the network 209. In some implementations, the user is authenticated to the restoration service 221 using one or more user credentials.

Thereafter, the user selects, from the user interface 265, an image of a torn document to be restored. In some embodiments, the selected image may be chosen from the preexisting images from the image library 231 that are associated with the user, uploaded from the client 206 through the user interface 265, and/or obtained from other possible sources. The selected image of a torn document can originate from various possible sources, such as being acquired through use of a document scanner, a camera such as may be present in a smartphone, or from other possible devices.

Figure 3:
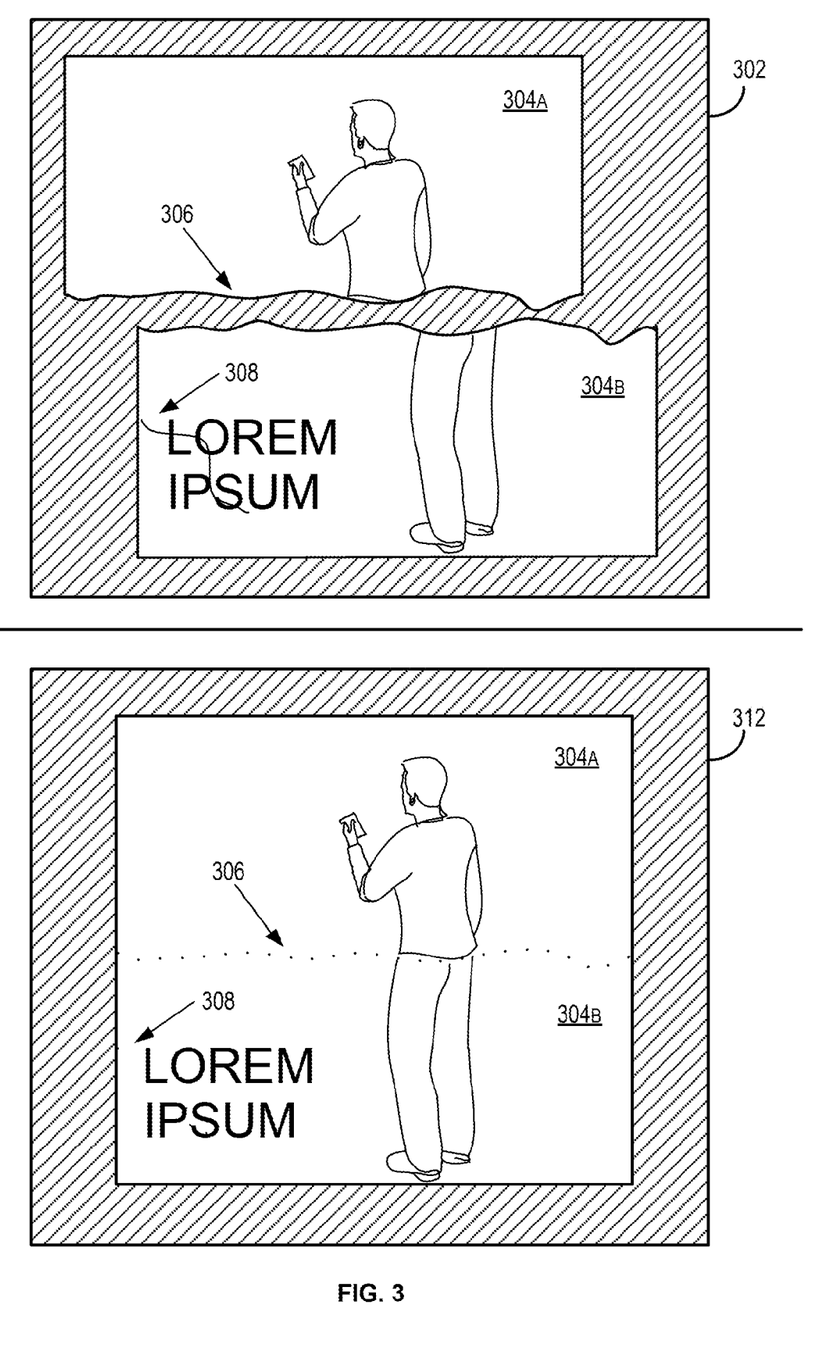
FIG. 3 is another pictorial diagram of an example image content restoration performed by the computing environment operating in the networked environment of FIG. 2 according to various embodiments of the present disclosure.

Shown in FIG. 3 is an exemplary image 302 such as may be selected by the user for content restoration. The physical document that is captured in the image 302 is torn into two separate pieces that are represented by two completely separated document portions 304a and 304b in the image. The document portions 304a-b in the image 302 are separated by a gap region 306 representing the space between the two distinct pieces of the torn physical document as it was captured in the image. The restoration service 221 can identify the document portions 304a-b within the exemplary image 302 based upon distinguishing the portions 304a-b from the surrounding background of the image 302 represented by the diagonal lines. The distinction between the document portions 304a-b and the background of the image can be recognized based on distinctions among one or more characteristics, such as the differences in color, texture, lighting, focus, and/or other possible characteristics. In addition, document portions 304a-b of the image can also be identified based in part upon recognizing content (e.g. text, figures) in these portions 304a-b of the image 302.

In some implementations, the restoration service 221 can use various heuristics for identifying the background and/or document portion in an image, such as identifying the background of the image based on identifying color, texture, content, etc. present along one or more edges of the perimeter of the image 302. For example, the edges of the image may represent a surface on which the torn document was placed when the image was captured. In various implementations, the restoration service 221 may identify the document portions 304a-b based in part upon using a boundary detection algorithm, such as included as part of the "Enhance Scans—Camera Images" feature used in Adobe® Acrobat® available from Adobe Systems, Inc. of San Jose, Calif. Once the boundaries of the document portions 304a-b are identified, the restoration service 221 can apply perspective correction and/or cropping of the image 302 to adjust for irregularities in the captured image. For example, the perspective correction can be used to map the quadrilateral representation of boundary shapes of the document portions, which may be distorted due to the angle at which the image was captured, into an aligned rectangular representation, including aligning the edges of the document portions. Various algorithms exist for performing perspective correction, such as described in "Interpolation using an Arbitrary Quadrilateral" available at https://www.particleincell.com/2012/quad-interpolation/.

The gap region 306, representing a tear in the document, can be identified in the image based on recognizing separation among identified document portions 304a-b and/or based on recognizing the presence of the background of the image 302 (i.e., the diagonal lines) between the portions 304a-b. For images in which the background is not visible in the tear, such as in the gap region 308, the restoration service 221 can identify the gap region 308 based upon recognizing a distinction among a color and/or texture from the document portion 304b of the image 302. For example, a coarse-textured, white region in an otherwise fine-textured, blue-colored document can be recognized as a tear in the document. In some implementations, a user can use an input device, such as a mouse or touch display, to specify one or more gap regions in the image that represent one or more tears in the document displayed in the image. For example, this may include encircling the torn area(s) of the image, selecting points within or along the torn area(s), and/or other possibilities. In addition, the user can use an input device to make adjustments to the area of an image defined as a gap region (e.g. adjusting the boundaries of a gap region), as well as correct any false-positive identification of a gap region.

In some implementations, a gap region in an image, such as the gap region 306, can be identified through a sequence of operations. For example, the restoration service 221 can apply a binarization filter to the image using a suitable threshold, where the filter produces a "binarized" image reduced to two colors (e.g., a color or grayscale image filtered to black-and-white). The threshold used in the binarization filter can be determined through various algorithms, such as Otsu's method. Subsequently, the restoration service 221 performs a Connected Component Analysis (CCA) to identify clusters of pixels in the binarized image which are connected to each other. Various CCA algorithms are known in the art and may be used, such as two-pass, one component at a time, etc. For each cluster of pixels (i.e., "connected component") identified in the binarized image, the restoration service 221 analyzes the cluster size (in terms of number of pixels) and removes those clusters from the binarized image which are smaller than a threshold size. For example, in a tear across the width of the image, the clusters whose width is less than a threshold width may be removed, where the threshold is based upon the width of the image. As a result, only the cluster of pixels representing the gap region in the binarized image remain, thereby distinguishing the pixels within the gap region from other pixels of the image.

Subsequently, the restoration service 221 identifies the content in the portions of the image 302 that are adjacent to the gap regions 306, 308. In some implementations, the content is identified through use of pattern matching and/or feature detection techniques (e.g. edge, corner, blob) and the various algorithms with which they may be implemented. Adjacent to the gap region 306, a figure of a person is divided such that part of the figure lies in the portion 304a and another part of the figure lies in portion 304b. Using the exemplary image 302, the restoration service 221 can determine a relationship between the parts of the divided figure in the portions 304a-b based on the corresponding size, edges, and/or lines of the parts of the figure and the distance of the parts from the edges of the respective portions 304a-b. Although the figure is shown without color or shading in the image 302, in some implementations, the restoration service 221 can determine a relationship between the parts of the divided figure in the portions 304a-b based on a corresponding color and/or texture between the two parts. This same technique can also be generalized to recognize color similarities that appear in other areas along the boundary of the respective portions 304a-b that may lie outside of any recognized figures.

In the example of FIG. 3, adjacent to the gap region 308, the restoration service 221 also identifies the presence of written alphabetic characters that can be recognized as such through use of optical character recognition (OCR). While any type of writing or figures adjacent to a gap region can be used as a basis for aligning the portions of the image adjacent to the gap region, using OCR to recognize the presence of complete words as a result of the alignment provides additional validation. In other implementations of the restoration service 221, identifying the content also includes identifying shapes of edges of the portions 304a-b of the image 302. Moreover, the restoration service 221 can use some or all of these content identification techniques on an image. For example, within a given image, the restoration service 221 can identify figures or other markings present, perform OCR to identify any characters or words present, identify colors of pixels in the portions of the image along a gap region, and/or identify the shape of the edges of the document portions captured in the image.

Once the content of the portions 304a-b of the image 302 has been identified and examined, the restoration service 221 adjusts the positions of the portions of the image 302 to reduce the gap regions 306, 308 without overlapping the edges of the portions. The adjustments can include changes to the horizontal, vertical, and/or angular/rotational positioning of the portions of the image 302 adjacent to the gap regions 306, 308. In particular, the positions of the portions 304a-b are adjusted to align the content along a boundary between the portions separated by the gap region 306. Along the gap region 306, various positioning strategies can be used based on the content previously detected. For example, the position of the portions 304a-b can be adjusted to align the lines of the figure of the person, as well as potentially any colors present in the portions 304a-b along the boundary between the portions. Alternatively, the position of the portions 304a-b can be adjusted based on determining a best fit between the shape and/or smoothness of the edges of portions 304a-b along the boundary.

In some implementations, in order to adjust the position of the document portions 304a-b, the restoration service 221 determines a separation distance in a previously identified gap region, such as the gap region 306, at various points along the length of the gap region. For example, once the document portions 304a-b are aligned based on their vertical edges in prior operations, the height of the gap region 306 (i.e., its separation distance) can be determined at each pixel along its boundary. An average height of the gap region 306 is then determined based on the collected height values. The heights for a gap region may be determined through use of various techniques, such as pixel masking. Subsequently, the restoration service 221 adjusts positions of one or both of the document portions 304a-b toward the other by an amount equal to the average height value, thereby shrinking the gap region 306.

In the event that characters were identified among the content of the image near a gap region, such as along the gap region 308, the restoration service 221 can also adjust the positions of these portions of the image 302 such that the content near the gap region forms identifiable characters and possibly words that can be verified using OCR and spell check. In the instant case of image 302, the gap region 308 only minimally separates the adjacent portions of the image, thus, only small adjustments to the position may be needed. In some implementations, a combination of adjustment strategies can be used by the restoration service 221. For example, the restoration service 221 can make coarse adjustments to the positioning of portions of the image 302 based on the shapes of the respective edges, then make more precise position adjustments based on correctly forming characters and words in the torn portions of the image 302.

Subsequently, once the adjustments to the positions portions of the image 302 have been made, the restoration service 221 may preview the restored image, such as shown in the image 312, to the user in the user interface 265. In the image 312, the location of the gap regions 306, 308 are shown for illustrative purposes, though such a visible line may not be shown during a typical presentation of the image 112 or can be shown when requested, such as for identifying the specific area adjusted in the image for a closer inspection. In some implementations, through the user interface 265, the user can rate the accuracy of the restoration performed by the restoration service 221, edit the adjustments made to the image 312 (e.g. fine-tune positioning of the portions of the image), and/or other possibilities. Thereafter, restoration service 221 may store any user-supplied accuracy rating, the adjustments and restoration actions applied to the image 302, as well as any changes made by the user, to the restoration history 233. The restored image 312 is stored to the image library 231, to the client 206, and/or to other possible locations.

Figure 4:
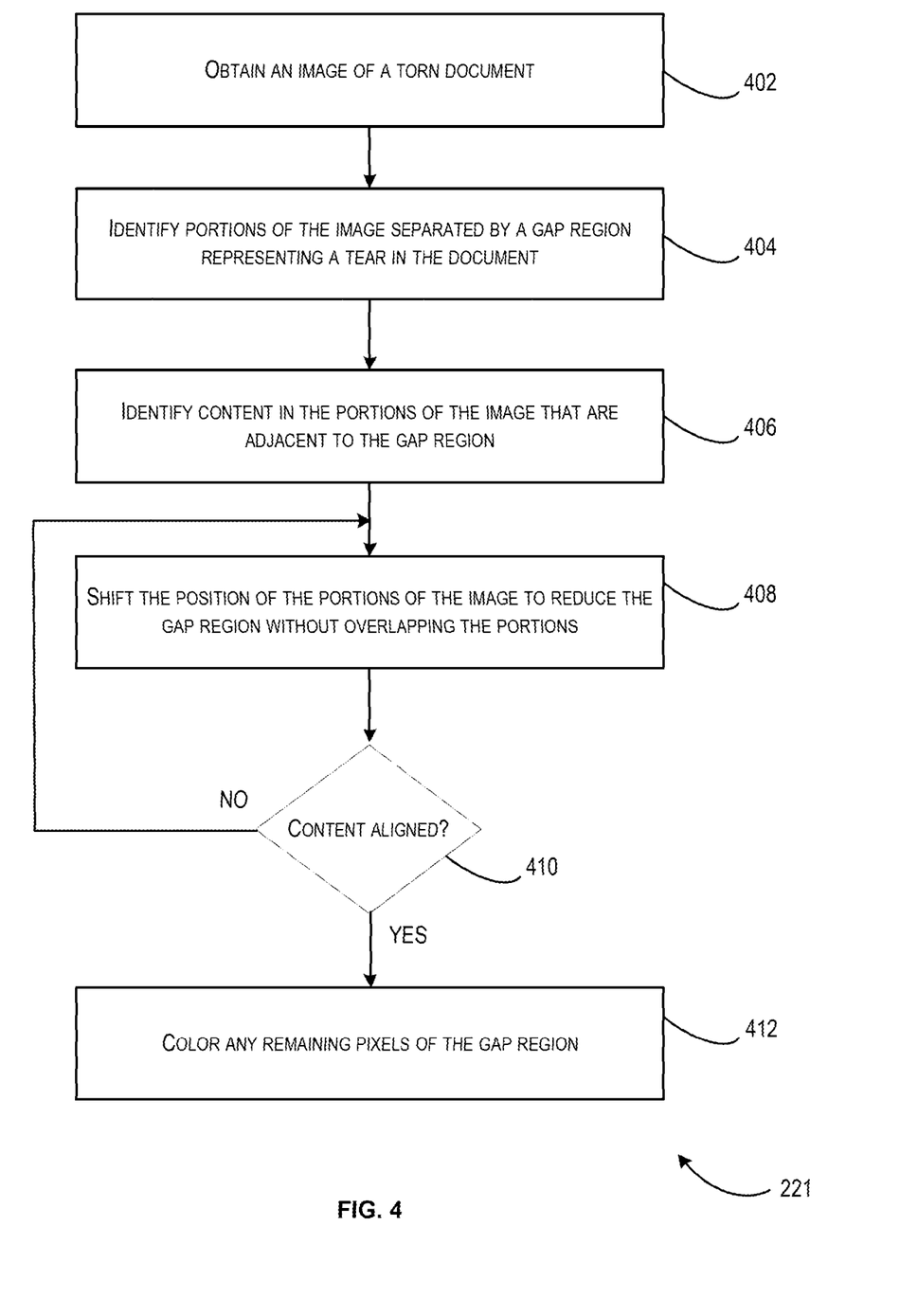
FIG. 4 is a flowchart illustrating one example of functionality implemented as portions of restoration service executed in a computing environment in the networked environment of FIG. 2 according to various embodiments of the present disclosure.

Referring next to FIG. 4, shown is a flowchart that provides one example of the operation of a portion of the restoration service 221 according to various embodiments. It is understood that the flowchart of FIG. 4 provides merely an example of the many different types of functional arrangements that may be employed to implement the operation of the portion of the restoration service 221 as described herein. As an alternative, the flowchart of FIG. 4 may be viewed as depicting an example of elements of a method implemented in the computing environment 203 according to one or more embodiments. The steps depicted in the flowchart of FIG. 4 may be implemented once a user has been authenticated to the restoration service 221.

Figure 5:
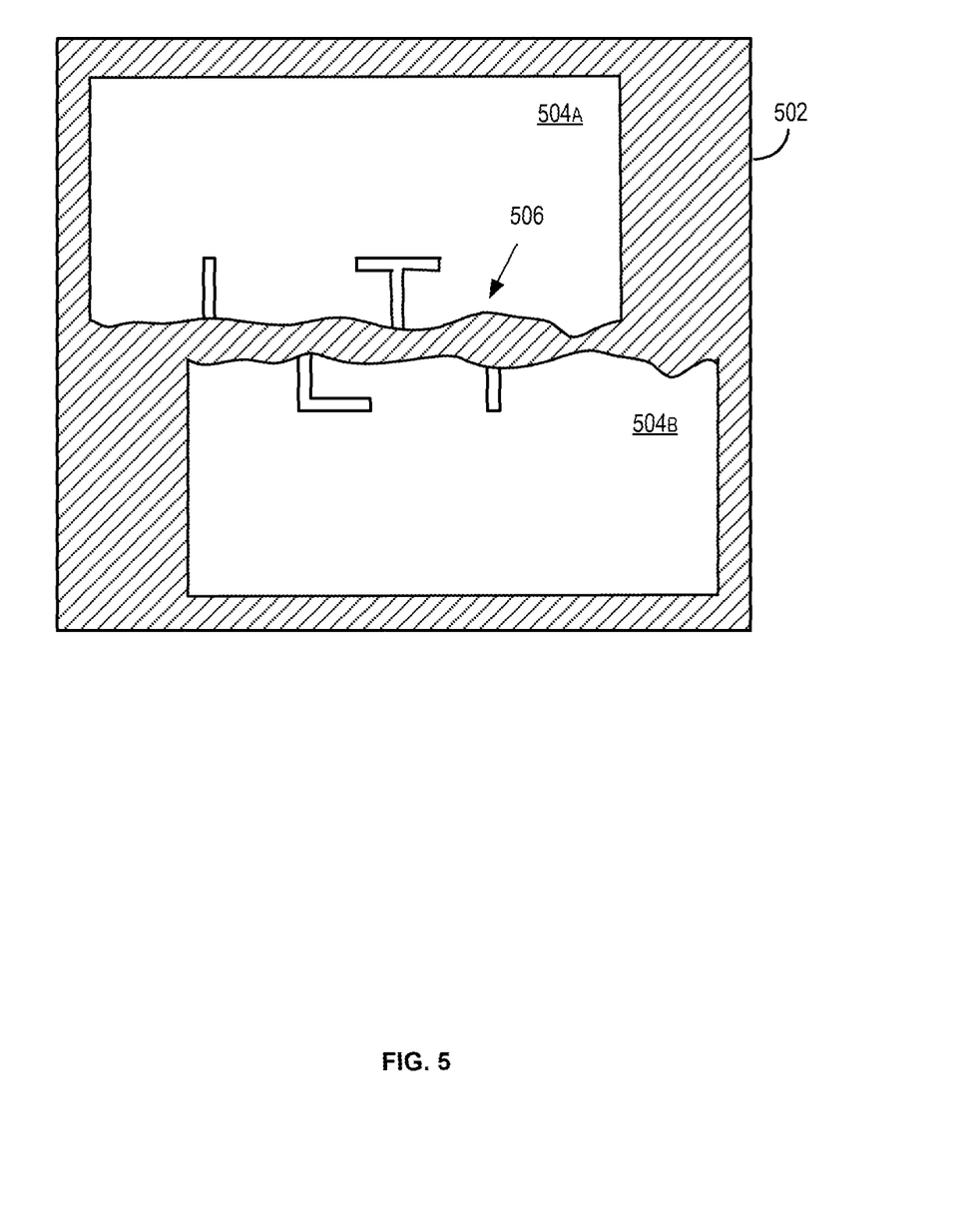
FIGS. 5-7 are pictorial diagrams of images that may be operated on by the restoration service executed in a computing environment in the networked environment of FIG. 2 according to various embodiments of the present disclosure.

Beginning with block 402, the user obtains an image of a physical document that is torn. As described above, the selected image may be chosen from the preexisting images from an image library accessible to the restoration service 221, uploaded from a client device through which the user communicates with the restoration service 221, and/or obtained from other possible sources. The selected image of a torn documents can originate from various possible sources, such as being acquired through use of a document scanner, a camera such as may be present in a smartphone, or from other possible devices. For example, in FIG. 5 is an exemplary image 502 such as may be selected by the user for content restoration. Although the exemplary image 502 selected by the user is of a document having only a single tear, images of a document having more than one tear can also be restored using the same techniques described herein. Moreover, these techniques also apply to images of a document having tears in which a portion of the document is torn, but still attached to another portion of the document (i.e., not resulting in complete separation).

Next, in block 404 of FIG. 4, the restoration service 221 identifies the portions of the image separated by one or more regions representing one or more tears in the document. Returning to FIG. 5, the torn physical document that is captured in the image 502 includes two separate document portions 504a and 504b. The document portions 504a-b in the exemplary image 502 are separated by a gap region 506 representing the space between the two distinct pieces of the torn physical document as it was captured in the image. The restoration service 221 can identify the document portions 504a-b within the exemplary image 502 based upon distinguishing the portions 504a-b from the surrounding background of the image 502 represented by the diagonal lines. The distinction between the document portions 504a-b and the background of the image can be recognized based on distinctions among one or more characteristics, such as the differences in color, texture, lighting, focus, and/or other possible characteristics. In addition, document portions 504a-b of the image can also be identified based in part upon recognizing content (e.g. text, figures) in these portions 504a-b of the image 502.

In various implementations, the restoration service 221 may identify the document portions 504a-b based in part upon using a boundary detection algorithm, such as included as part of the "Enhance Scans—Camera Images" feature used in Adobe® Acrobat® available from Adobe Systems, Inc. of San Jose, Calif. Once the boundaries of the document portions 504a-b are identified, the restoration service 221 can apply perspective correction and/or cropping of the image 502 to adjust for irregularities in the captured image. For example, the perspective correction can be used to map the quadrilateral boundary shapes of the document portions, which may be distorted due to the angle at which the image was captured, into an aligned rectangular form, including aligning the edges of the document portions. Various algorithms exist for performing perspective correction, such as described in "Interpolation using an Arbitrary Quadrilateral" available at https://www.particleincell.com/2012/quad-interpolation/.

The gap region 506, representing a tear in the document, can be identified in the image based on recognizing separation among identified document portions 504a-b and/or based on recognizing the presence of the background of the image 502 (i.e., the diagonal lines) between the portions 504a-b. In some implementations, a gap region in an image, such as the gap region 506, can be identified through a sequence of operations. For example, the restoration service 221 can apply a binarization filter to the image using a suitable threshold, where the filter produces a "binarized" version of the image reduced to two colors. The threshold used in the binarization filter can be determined through various algorithms, such as Otsu's method. Subsequently, the restoration service 221 performs a Connected Component Analysis (CCA) to identify clusters of pixels in the binarized image which are connected to each other. Various CCA algorithms are known in the art and may be used, such as two-pass, one component at a time, etc. For each cluster of pixels identified in the binarized image, the restoration service 221 analyzes the cluster size (in terms of number of pixels) and removes those clusters from the binarized image which are smaller than a threshold size. For example, in a tear across the width of the image, the clusters whose width is less than a threshold width may be removed, where the threshold is based upon the width of the image. As a result, only the cluster of pixels representing the gap region in the binarized image remain, thereby distinguishing the pixels within the gap region from other pixels of the image.

Then, in block 406 of FIG. 4, the restoration service 221 identifies content in portions of the image that are adjacent to gap regions. For example, returning to FIG. 5, adjacent to the gap region 506, are two figures of alphabetic characters (i.e., 'L' and 'T') divided such that parts of the figures lie in the portion 504a and other parts of the figures lie in portion 504b. Using the exemplary image 502, the restoration service 221 can determine a relationship between the parts of the divided figure in the portions 304a-b based on the corresponding size, edges, and/or lines of the parts of the figures and the distance of the parts from the edges of the respective portions 504a-b. Although the figure is shown without color or shading in the image 502, in some implementations, the restoration service 221 can determine a relationship between the parts of the divided figure in the portions 504a-b based on a corresponding color and/or texture between the two parts. This same technique can also be generalized to recognize color similarities that appear in other areas along the boundary of the respective portions 504a-b that may lie outside of any recognized figures.

The restoration service 221 can also utilize OCR to identify the presence of written characters (e.g. alphanumeric) or, in some instances, constituent parts of such characters among the portions 504a-b of the image 502. While any type of writing or figures adjacent to a gap region can be used as a basis for aligning the portions of the image adjacent to the gap region, using OCR to recognize the presence of complete characters as a result of the alignment provides additional validation, as does using spell check to confirm a sequence of characters forms an identifiable word. In other implementations of the restoration service 221, identifying the content also includes identifying shapes of edges of the portions 304a-b of the image 302. Moreover, the restoration service 221 can use some or all of these content identification techniques on an image.

Subsequently, in block 408 of FIG. 4, the restoration service 221 shifts the portions of the image to reduce a gap region without overlapping the portions. The adjustments can include changes to the horizontal, vertical, and/or angular/rotational positioning of the portions of the image adjacent to a given gap region. In particular, the positions of the portions are adjusted to align the content along a boundary between the portions separated by the gap region. Along the gap region, various positioning strategies can be used based on the content previously detected. For example, returning to FIG. 5, the position of the portions 504a-b can be adjusted to align the lines of the characters, as well as potentially any colors present in the portions 504a-b along the boundary between the portions. In addition, the position of the portions 504a-b can be adjusted based on determining a best fit between the shape of the edges of portions 504a-b along the boundary. In some implementations, a combination of adjustment strategies can be used by the restoration service 221. For example, the restoration service 221 can make coarse adjustments to the positioning of portions of the image 502 based on the shapes of the respective edges, then make more precise position adjustments based on correctly forming characters in the portions 504a-b of the image.

In some implementations, in order to adjust the position of the document portions 504a-b, the restoration service 221 determines a separation distance in the previously identified gap region at various points along the length of the gap region. For example, once the document portions 504a-b are aligned based on their vertical edges in prior operations, the height of the gap region 506 can be determined at each pixel along its boundary. An average height of the gap region 506 is then determined based on the collected height values. Subsequently, the restoration service 221 adjusts positions of one or both of the document portions 504a-b toward the other by an amount equal to the average height value, thereby shrinking the gap region 506.

Next, in block 410 of FIG. 4, the restoration service 221 determines whether currently adjusted position of the portions properly aligns the content. For example, in FIG. 5, are the lines of the '1' and 'T' characters straight, are the edges of the portions 504a-b aligned both along the gap region 506 and along the vertical edges, are any colors of the portions 504a-b along the gap region 506 matching, etc. If, in block 410 of FIG. 4, the content is not aligned to meet a threshold value, execution of the restoration service 221 returns to block 408. It should be noted that this threshold value may be set based on user preference and/or based on the previously received accuracy ratings from the user. Alternatively, if in block 410 the content is sufficiently aligned, execution of the restoration service 221 proceeds to block 412.

Figure 6:
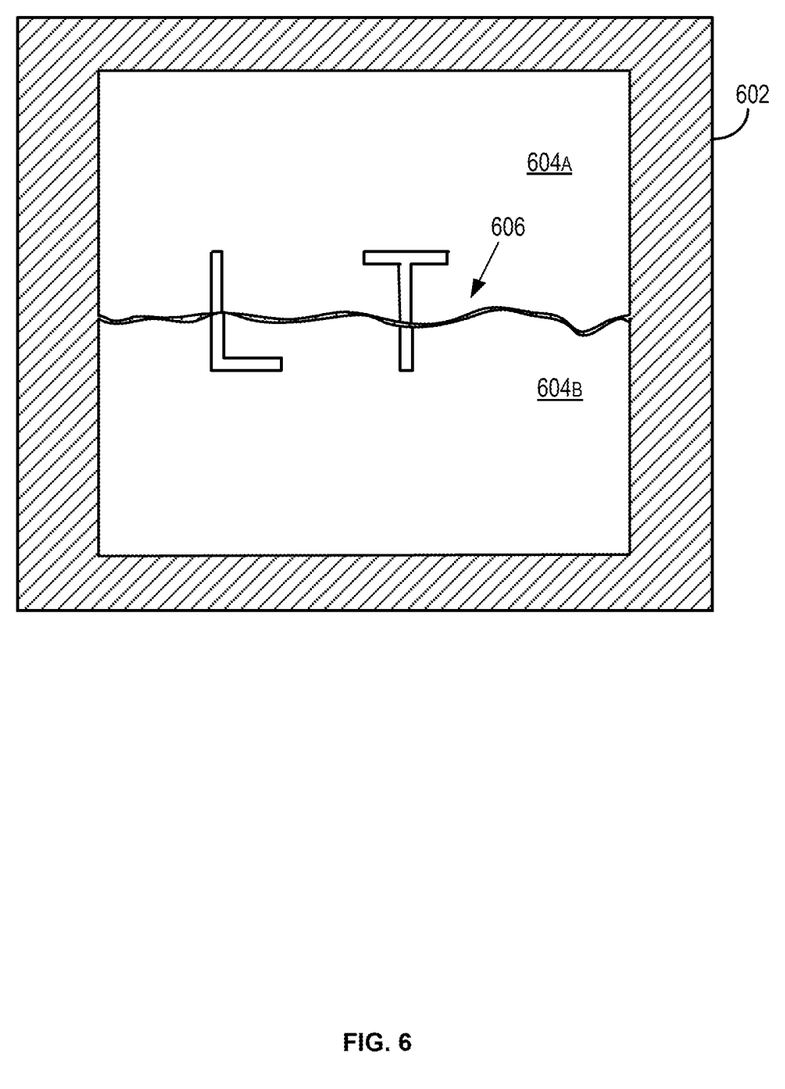

Then, in block 412, the restoration service 221 colors remaining pixels of the gap region. For example, in FIG. 6, the image 602 is shown that represents the image 502 (FIG. 5) after having been adjusted to align the content in the portions of the image. As shown, the gap region 606 has been minimized, but the restoration is still conspicuous and small portions of the background of the image (the diagonal lines) are still visible. As a result, the restoration service 221 may color some or all of the remaining segments of the gap region 606 based on the pixels from portions 604a-b that are adjacent to the respective segments. For example, if a segment of the gap region 606 exists and the portions 604a-b on either side of the segment have red pixels, then this segment of the gap region can also be colored with red pixels. Such color sampling techniques may be carried out using various algorithms, such as Content-Aware Fill technology used in Adobe® Photoshop® available from Adobe Systems, Inc. of San Jose, Calif., which will determine a replacement for a selected area of an image (e.g., remaining gap region) based on the surrounding area of the image.

Figure 7:
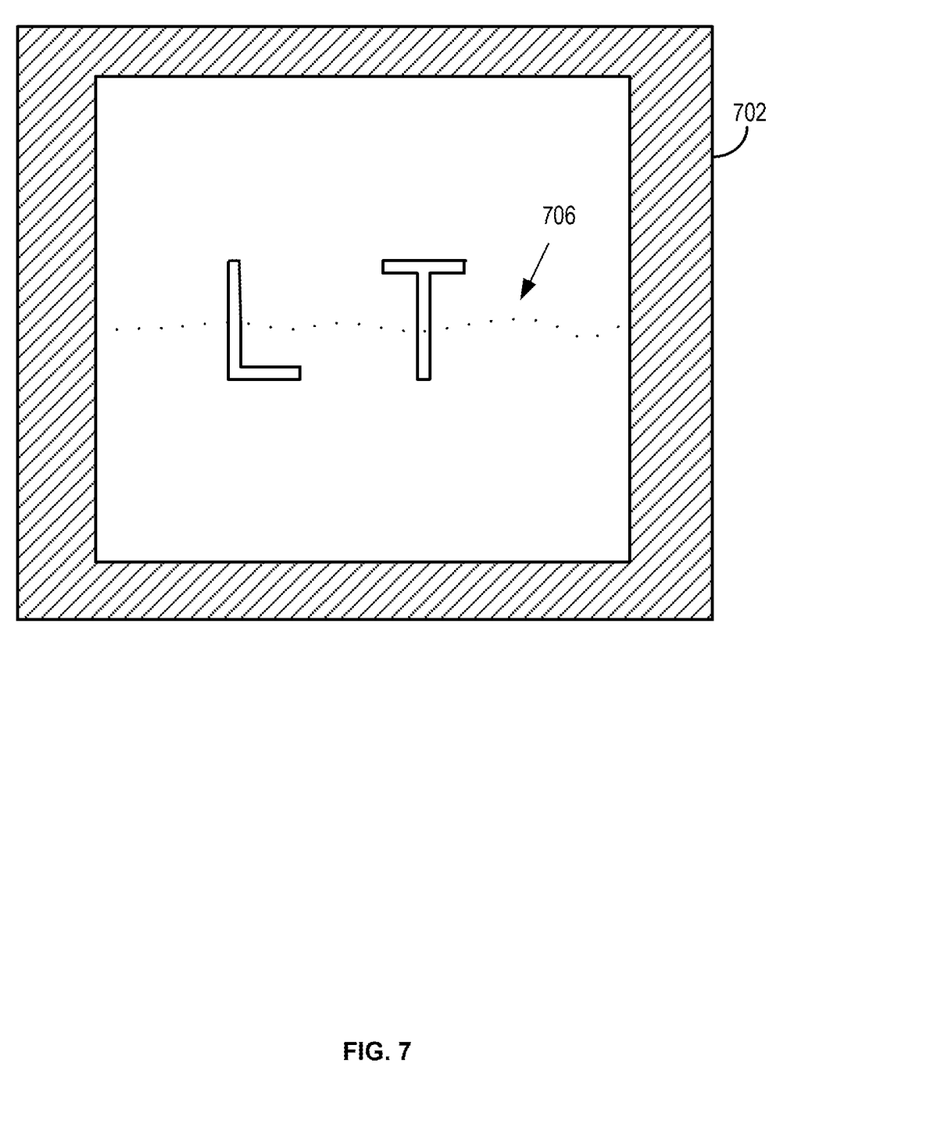

Subsequently, once some or all of the remaining gap regions have been colored (also referred to as "filled"), the restoration service 221 may produce the restored image, such as shown in the image 702 of FIG. 7. In the image 702, the location of the corrected gap region 706 is shown for illustrative purposes, though such a visible line may not be shown during a typical presentation of the image 702 or can be shown when requested.

Figure 8:
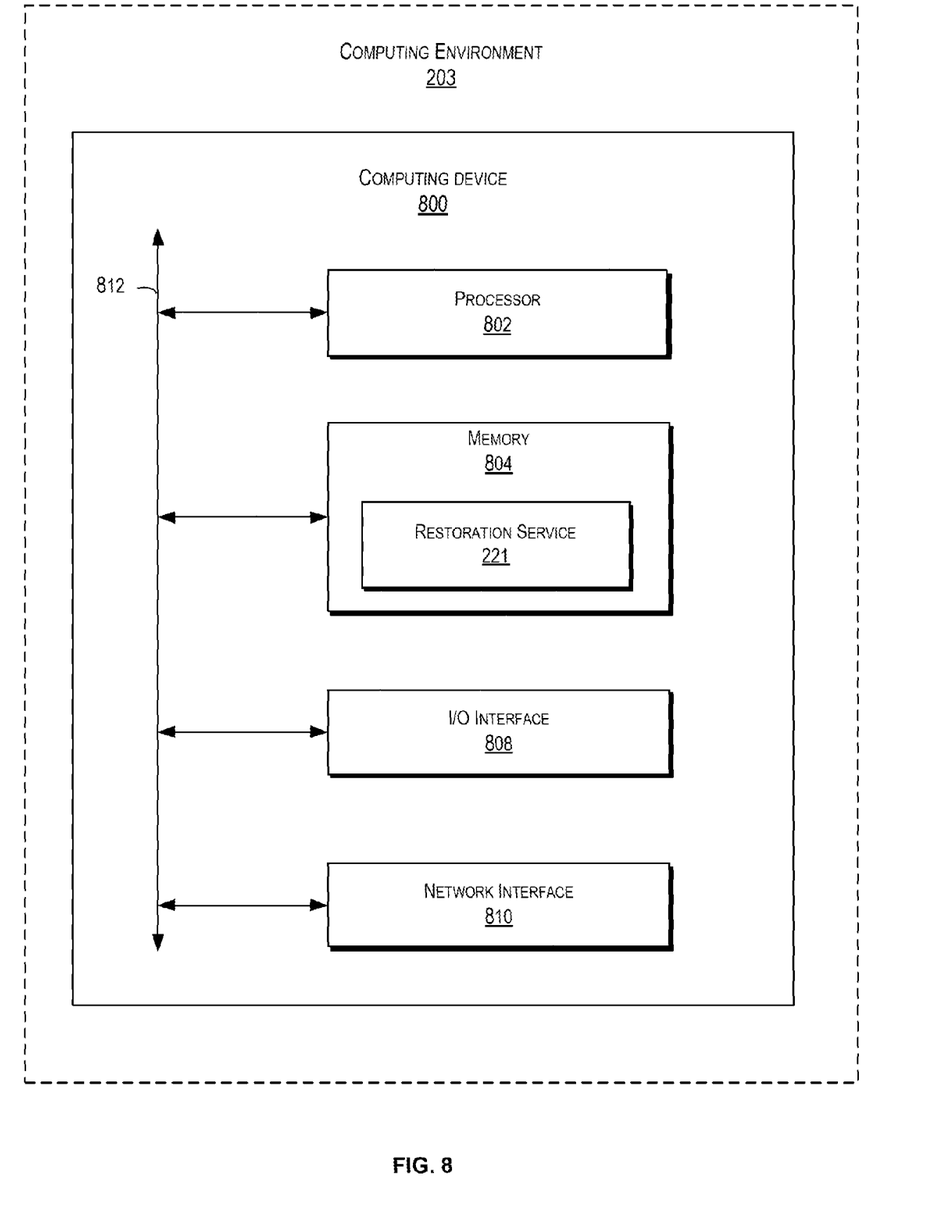
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 800. Each computing device 800 includes at least one processor circuit, for example, having a processor 802, a memory 804, an I/O interface 808, and a network interface 810, all of which are coupled to a local interface 812. To this end, each computing device 800 may comprise, for example, at least one server computer or like device. The local interface 812 may comprise, for example, a data bus with an accompanying address/control bus or other bus structure as can be appreciated.

Stored in the memory 804 are both data and several components that are executable by the processor 802. In particular, stored in the memory 804 and executable by the processor 802 is the restoration service 221, and potentially other applications. Also stored in the memory 804 may be a data store and other data. In addition, an operating system may be stored in the memory 804 and executable by the processor 802.

It is understood that there may be other applications that are stored in the memory 804 and are executable by the processor 802 as can be appreciated. Where any component discussed herein is implemented in the form of software, any one of a number of programming languages may be employed such as, for example, C, C++, C#, Objective C, Java®, JavaScript, Perl, PHP, Visual Basic®, Python®, Ruby, Flash®, or other programming languages.

A number of software components are stored in the memory 804 and are executable by the processor 802. In this respect, the term "executable" means a program file that is in a form that can ultimately be run by the processor 802. Examples of executable programs may be, for example, a compiled program that can be translated into machine code in a format that can be loaded into a random access portion of the memory 804 and run by the processor 802, source code that may be expressed in proper format such as object code that is capable of being loaded into a random access portion of the memory 804 and executed by the processor 802, or source code that may be interpreted by another executable program to generate instructions in a random access portion of the memory 804 to be executed by the processor 802, etc. An executable program may be stored in any portion or component of the memory 804 including, for example, random access memory (RAM), read-only memory (ROM), hard drive, solid-state drive, USB flash drive, memory card, optical disc such as compact disc (CD) or digital versatile disc (DVD), magnetic tape, or other memory components.

The memory 804 is defined herein as including both volatile and nonvolatile memory and data storage components. Volatile components are those that do not retain data values upon loss of power. Nonvolatile components are those that retain data upon a loss of power. Thus, the memory 804 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 802 may represent multiple processors 802 and/or multiple processor cores and the memory 804 may represent multiple memories 804 that operate in parallel processing circuits, respectively. In such a case, the local interface 812 may be an appropriate network that facilitates communication between any two of the multiple processors 802, between any processor 802 and any of the memories 804, or between any two of the memories 804, etc. The local interface 812 may comprise additional systems designed to coordinate this communication, including, for example, performing load balancing. The processor 802 may be of electrical or of some other available construction.

Although the restoration service 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the restoration service 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 802 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the restoration service 221, that comprises software or code can be embodied in any non-transitory computer-readable medium for use by or in connection with an instruction execution system such as, for example, a processor 802 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the restoration service 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for digitally restoring content from a torn document, the method comprising:

obtaining, from a client computing device, an image of a document that has a tear;

identifying, by a restoration service executed in a computing environment, portions of the image and a gap region representing the tear in the document, wherein the portions of the image are separated by the gap region;

distinguishing, by the restoration service, the gap region from the portions of the image based on a distinction between (i) a first characteristic of pixels included in the portions of the image and (ii) a second characteristic of pixels included in the gap region;

identifying, by the restoration service, content in each of the portions of the image adjacent to the gap region, wherein identifying the content comprises identifying characters in the portions of the image by performing optical character recognition (OCR) on the content present in the portions of the image; and incrementally adjusting, by the restoration service, a position of at least one of the portions of the image relative to another of the portions of the image, to reduce separation in the gap region without overlapping the portions, wherein:

the position of the at least one portion is adjusted to align the content along a boundary between the portions of the image to form an identifiable sequence of the characters along the boundary, and the adjustment of the position of the at least one portion is based on the first characteristic, wherein the first characteristic is present in pixels included in the at least one portion and in pixels included in the another of the portions of the image.

2. The method of claim 1, further comprising coloring remaining pixels of the gap region based upon color sampling adjacent pixels, wherein said coloring occurs once the content is aligned along the boundary between the portions of the image.

3. The method of claim 1, wherein the gap region is identified based upon identifying a region in which a color or texture at a perimeter of the document represented in the image is also present between portions of the document represented in the image.

4. The method of claim 1, wherein the gap region is identified based upon input received from a user specifying a portion of the gap region.

5. The method of claim 1, wherein said identifying the content further comprises identifying shapes of edges of the portions of the image adjacent to the gap region.

6. The method of claim 1, wherein identifying the gap region comprises:

applying a binarization filter to the image to produce a binarized version of the image; and performing a connected component analysis (CCA) on the binarized version of the image that removes clusters of pixels whose size is smaller than a threshold size, wherein a remaining cluster of pixels is the gap region.

7. The method of claim 1, wherein said first characteristic comprises colors of pixels along edges of the portions of the image adjacent to the gap region, and identifying the content further comprises identifying the colors of pixels included in the portions of the image.

8. The method of claim 7, wherein said aligning the content along the boundary comprises adjusting the position of the at least one portion of the image based upon aligning the colors of the pixels along the edges.

9. The method of claim 1, further comprising converting a quadrilateral representation of the document captured in the portions of the image into a rectangular representation, wherein said converting comprises:

identifying a plurality of boundaries of the document captured in the portions of the image; and performing a perspective correction upon the boundaries of the document.

10. The method of claim 1, wherein said adjusting the position of the at least one of the portions of the image comprises adjusting at least one of a horizontal position, a vertical position, and an angular position of the at least one of the portions of the image.

11. A non-transitory computer-readable medium embodying a program comprising code for digitally restoring content from a torn document, the program, when executed in a computing device, causes the computing device to:

obtain an image of a document that has a tear;

identify portions of the image and a gap region representing the tear in the document, wherein the portions of the image are separated by the gap region;

distinguish the gap region from the portions of the image based on a distinction between (i) a first characteristic of pixels included in the portions of the image and (ii) a second characteristic of pixels included in the gap region;

identify content in each of the portions of the image adjacent to the gap region, wherein identifying the content comprises identifying characters in the portions of the image by performing optical character recognition (OCR) on the content present in the portions of the image; and adjust a position of at least one of the portions of the image relative to another of the portions of the image, to reduce separation in the gap region without overlapping the portions, wherein:

the position of the at least one portion is adjusted to align the content along a boundary between the portions of the image to form an identifiable sequence of the characters along the boundary, and the adjustment of the position of the at least one portion is based on the first characteristic, wherein the first characteristic is present in pixels included in the at least one portion and in pixels included in the another of the portions of the image.

12. The non-transitory computer-readable medium of claim 11, the program further comprises code that colors any remaining pixels of the gap region based upon color sampling adjacent pixels, wherein said coloring occurs once the content is aligned along the boundary between the portions of the image.

13. The non-transitory computer-readable medium of claim 11, wherein the program further comprises code that identifies the gap region based upon identifying a region in which a color or texture at a perimeter of the document represented in the image is also present between portions of the document represented in the image.

14. A computing device, comprising:

a memory for storing a restoration service comprising computer-implemented instructions for digitally restoring content from a torn document; and a processor for executing the computer-implemented instructions of the restoration service and thereby causing the processor to:

obtain an image of a document that has a tear;

identify portions of the image and a gap region representing the tear in the document, wherein the portions of the image are separated by the gap region;

distinguish the gap region from the portions of the image based on a distinction between (i) a first characteristic of pixels included in the portions of the image and (ii) a second characteristic of pixels included in the gap region;

identify content in each of the portions of the image adjacent to the gap region, wherein identifying the content comprises identifying characters in the portions of the image by performing optical character recognition (OCR) on the content present in the portions of the image; and adjust a position of at least one of the portions of the image relative to another of the portions of the image, to reduce separation in the gap region without overlapping the portions, wherein:

the position of the at least one portion is adjusted to align the content along a boundary between the portions of the image to form an identifiable sequence of the characters along the boundary, and the adjustment of the position of the at least one portion is based on the first characteristic, wherein the first characteristic is present in pixels included in the at least one portion and in pixels included in the another of the portions of the image.

15. The computing device of claim 14, wherein the computer-implemented instructions further cause the processor to color remaining pixels of the gap region based upon color sampling adjacent pixels, wherein said coloring occurs once the content is aligned along the boundary between the portions of the image.

\* \* \* \* \*